US012692944B2

(12) United States Patent
Kang et al.

(10) Patent No.: US 12,692,944 B2
(45) Date of Patent: Jul. 28, 2026

(54) ELECTRONIC EXPANSION VALVE

(71) Applicant: ZHEJIANG DUNAN ARTIFICIAL ENVIRONMENT CO., LTD., Shaoxing (CN)

(72) Inventors: Zhijun Kang, Shaoxing (CN); Fangying Zhu, Shaoxing (CN)

(73) Assignee: ZHEJIANG DUNAN ARTIFICIAL ENVIRONMENT CO., LTD., Shaoxing (CN)

( * ) Notice: Subject to any disclaimer, the term of this patent is extended or adjusted under 35 U.S.C. 154(b) by 80 days.

(21) Appl. No.: 18/709,773

(22) PCT Filed: Nov. 15, 2022

(86) PCT No.: PCT/CN2022/132022
§ 371 (c)(1),
(2) Date: May 13, 2024

(87) PCT Pub. No.: WO2023/088254
PCT Pub. Date: May 25, 2023

(65) Prior Publication Data
US 2025/0003499 A1     Jan. 2, 2025

(30) Foreign Application Priority Data
Nov. 19, 2021    (CN) .......................... 202122862189.3

(51) Int. Cl.
*F16K 1/04*      (2006.01)
*F16K 1/52*      (2006.01)
*F25B 41/35*     (2021.01)

(52) U.S. Cl.
CPC ................ *F16K 1/04* (2013.01); *F16K 1/523* (2013.01); *F25B 41/35* (2021.01)

(58) Field of Classification Search
CPC ... F16K 1/04; F16K 1/523; F16K 1/32; F16K 1/38; F16K 1/10; F16K 27/02;
(Continued)

(56) References Cited

U.S. PATENT DOCUMENTS

2021/0060328 A1     3/2021   Nomura et al.

FOREIGN PATENT DOCUMENTS

| CN | 104896810 A | * | 9/2015 | ............... F16K 1/52 |
| CN | 211145371 U | * | 7/2020 | |

(Continued)

OTHER PUBLICATIONS

First Office Action dated Mar. 26, 2025 received in JP Patent Application No. 2024-523125.

*Primary Examiner* — Emmanuel E Duke
(74) *Attorney, Agent, or Firm* — The Sun IP Law

(57) ABSTRACT

Disclosed is an electronic expansion valve. The electronic expansion valve includes: a valve housing, wherein the valve housing is provided with an accommodating cavity and a valve port, and the accommodating cavity is in communication with the valve port; a valve needle, wherein the valve needle is provided with a first end and a second end, the second end of the valve needle blocks or opens the valve port, and the valve needle includes a first guide section, a threaded section and a second guide section that are sequentially arranged; and a nut seat, wherein the nut seat is arranged in the accommodating cavity and is fixedly connected with the valve housing, a first through hole is provided on the nut seat, and the first through hole includes a first guide hole section, a threaded hole section and a second guide hole section that are sequentially arranged.

9 Claims, 5 Drawing Sheets

(58) Field of Classification Search
CPC ...... F16K 27/08; F16K 27/0254; F16K 31/04;
F16K 31/06; F16K 31/508; F25B 41/35;
F25B 41/34; Y02B 30/70
See application file for complete search history.

(56) References Cited

FOREIGN PATENT DOCUMENTS

| | | | | | |
|----|----------------|---|--------|----------------|---------|
| CN | 113294528 A | * | 8/2021 | ............... | F16K 1/38 |
| CN | 216242311 U | * | 4/2022 | ............... | F16K 1/38 |
| JP | 2010048138 A | | 3/2010 | | |
| JP | 3195271 U | | 1/2015 | | |
| WO | WO-2020034423 A1 | * | 2/2020 | ............... | F16K 1/00 |

* cited by examiner

ELECTRONIC EXPANSION VALVE

CROSS-REFERENCE TO RELATED APPLICATION

The present disclosure claims the priority to patent application No. 202122862189.3, filed with the China National Intellectual Property Administration on Nov. 19, 2021 and entitled "Electronic expansion valve".

TECHNICAL FIELD

The present disclosure relates to the technical field of expansion valves, and in particular to an electronic expansion valve.

BACKGROUND

In a prior art, an external thread is arranged on a valve needle of an electronic expansion valve. The external thread is in threaded connection with an internal thread of a nut seat, and the valve needle rotates relative to the nut seat to block or open a valve port. However, an existing device has a simple structure, resulting in poor coaxiality between the valve needle and the valve port, thereby reducing overall control precision of the electronic expansion valve.

SUMMARY

The present disclosure provides an electronic expansion valve, so as to solve the problem of poor coaxiality between a valve needle and a valve port in the prior art.

The present disclosure provides an electronic expansion valve. The electronic expansion valve includes: a valve housing, wherein the valve housing is provided with an accommodating cavity and a valve port, and the accommodating cavity is in communication with the valve port; a valve needle, where the valve needle is provided with a first end and a second end that are arranged opposite each other, the second end of the valve needle blocks or opens the valve port, and the valve needle includes a first guide section, a threaded section and a second guide section that are sequentially arranged, wherein the first guide section is arranged close to the first end of the valve needle, and the second guide section is arranged close to the second end of the valve needle; and a nut seat, where the nut seat is arranged in the accommodating cavity and is fixedly connected with the valve housing, a first through hole is provided on the nut seat, and the first through hole includes a first guide hole section, a threaded hole section and a second guide hole section that are sequentially arranged, where the valve needle is arranged in the first through hole in a penetrating manner, the first guide hole section is cooperated with the first guide section for guiding, the threaded hole section is in threaded connection with the threaded section, and the second guide hole section is cooperated with the second guide section for guiding.

By applying the technical solution of the present disclosure, the first guide hole section matches the first guide section for guiding, and the first guide section is arranged close to the first end of the valve needle. Thus, the valve needle, especially a portion of the valve needle close to the first end of the valve needle, can be guided. Then, the second guide hole section matches the second guide section for guiding, and the second guide section is arranged close to the second end of the valve needle. Thus, a portion of the valve needle close to the second end of the valve needle can be guided. The valve needle and the valve port can maintain high coaxiality by means of matching of guide structures at two ends of the valve needle, thereby improving overall control precision of the electronic expansion valve.

Further, the first guide hole section is in clearance fit with the first guide section, and the second guide hole section is in clearance fit with the second guide section. Thus, a guiding effect on the valve needle can be ensured while stable movement of the valve needle is ensured.

Further, a diameter of the first guide section is greater than a diameter of the threaded section, and a diameter of the threaded section is greater than a diameter of the second guide section. With such a configuration, the valve needle can be conveniently mounted into the first through hole from a portion above the first through hole, thereby improving mounting efficiency.

Further, an air hole is provided on the nut seat, and the air hole is in communication with the first through hole. The air hole is configured to balance an air pressure in the first through hole and the accommodating cavity, such that the valve needle moves smoothly.

Further, a first hole section is arranged between the threaded hole section and the second guide hole section, an inner diameter of the first hole section is greater than an inner diameter of the second guide hole section and less than an inner diameter of the threaded hole section, and the air hole is provided on a side wall of the first hole section. Thus, the air pressure in the first through hole and the accommodating cavity can be well balanced.

Further, the valve needle further includes a third guide section, where the third guide section is arranged on a side of the first guide section away from the threaded section; and the electronic expansion valve further includes a magnetic rotor, where the magnetic rotor is arranged in the accommodating cavity, and the magnetic rotor is fixedly connected with the third guide section. When the magnetic rotor rotates, the third guide section and the valve needle are driven to rotate, such that the valve needle rotates relative to the nut seat and moves in an axial direction.

Further, a diameter of the third guide section is less than a diameter of the first guide section. With such a configuration, the electronic expansion valve can be compact in structure and small in size.

Further, the electronic expansion valve further includes a connecting plate, where the connecting plate is arranged in the magnetic rotor, a peripheral edge of the connecting plate is fixedly connected with the magnetic rotor, a second through hole is provided on the connecting plate, the second through hole is provided coaxial with the first through hole, and the third guide section is arranged in the second through hole in a penetrating manner and is fixedly connected with an inner wall of the second through hole. The connecting plate is arranged, thereby enhancing connection stability of the third guide section and the magnetic rotor.

Further, the electronic expansion valve further includes a stopper, wherein a stop structure is arranged between the stopper and the nut seat, an upper surface of the stopper is fixedly connected with a bottom surface of the connecting plate, a third through hole is provided on the stopper, and the third through hole includes a second hole section and a third hole section that are in communication with each other, wherein an inner diameter of the second hole section is less than an inner diameter of the third hole section, the third guide section is arranged in the third through hole in a penetrating manner, and the third guide section is in transition fit with the second hole section. The third guide section is in transition fit with the second hole section, and thus, the second hole section can guide the third guide section.

Further, the stop structure includes: a first stop boss and a second stop boss that are arranged on an inner wall of the third hole section at an interval in an axial direction of the first through hole; and a stop portion arranged on an outer side wall of the nut seat, wherein the stop portion is located between the first stop boss and the second stop boss, the valve needle has a maximum opening position opening the valve port and a closing position blocking the valve port, and the first stop boss abuts against the stop portion when the valve needle moves to the closing position, and the second stop boss abuts against the stop portion when the valve needle moves to the maximum opening position. With such a configuration, a vertical movement range of the valve needle is determined, such that an excessively large size of the valve body caused by excessively high upward displacement of the valve needle is avoided, and damage of the valve needle or the valve port caused by impact generated to the valve port when the valve needle falls is avoided, thereby prolonging service life of the electronic expansion valve.

BRIEF DESCRIPTION OF THE DRAWINGS

The accompanying drawings constituting a part of the description serve to provide a further understanding of the present disclosure, and the illustrative examples of the present disclosure and the description of the illustrative examples serve to explain the present disclosure and are not to be construed as unduly limiting the present disclosure. In the figures.

Figure 1:
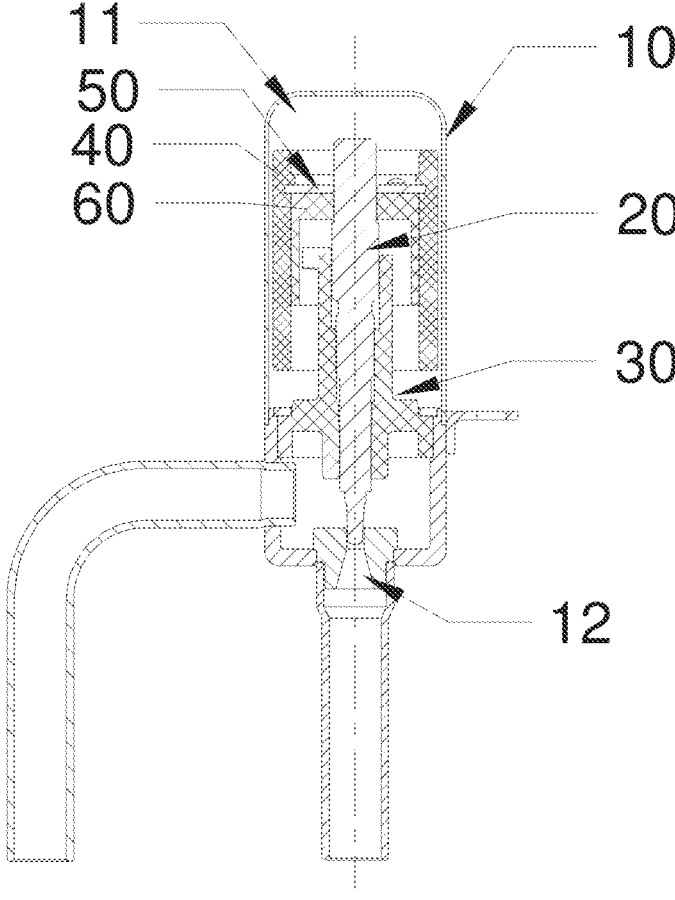
FIG. 1 shows a sectional view of an electronic expansion valve according to an embodiment of the present disclosure.
Figure 2:
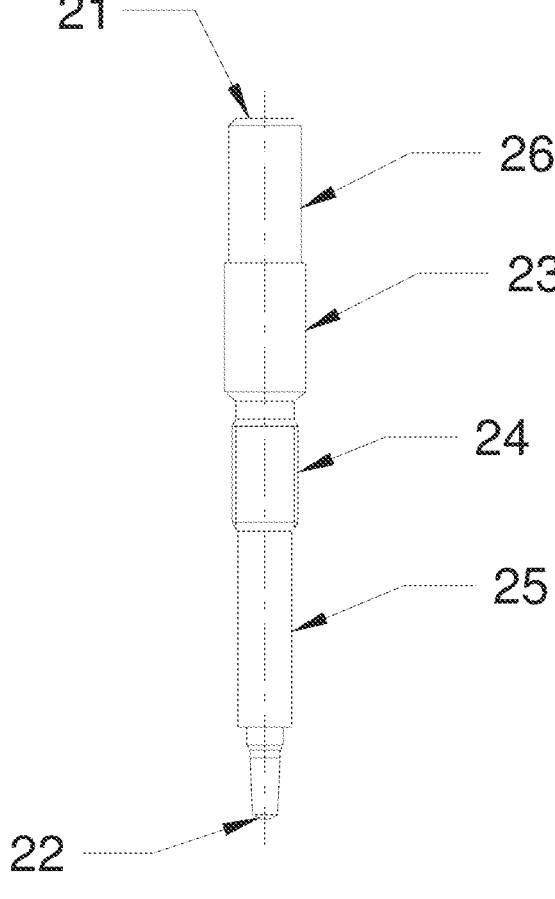
FIG. 2 shows a schematic structural diagram of a valve needle according to an embodiment of the present disclosure.
Figure 3:
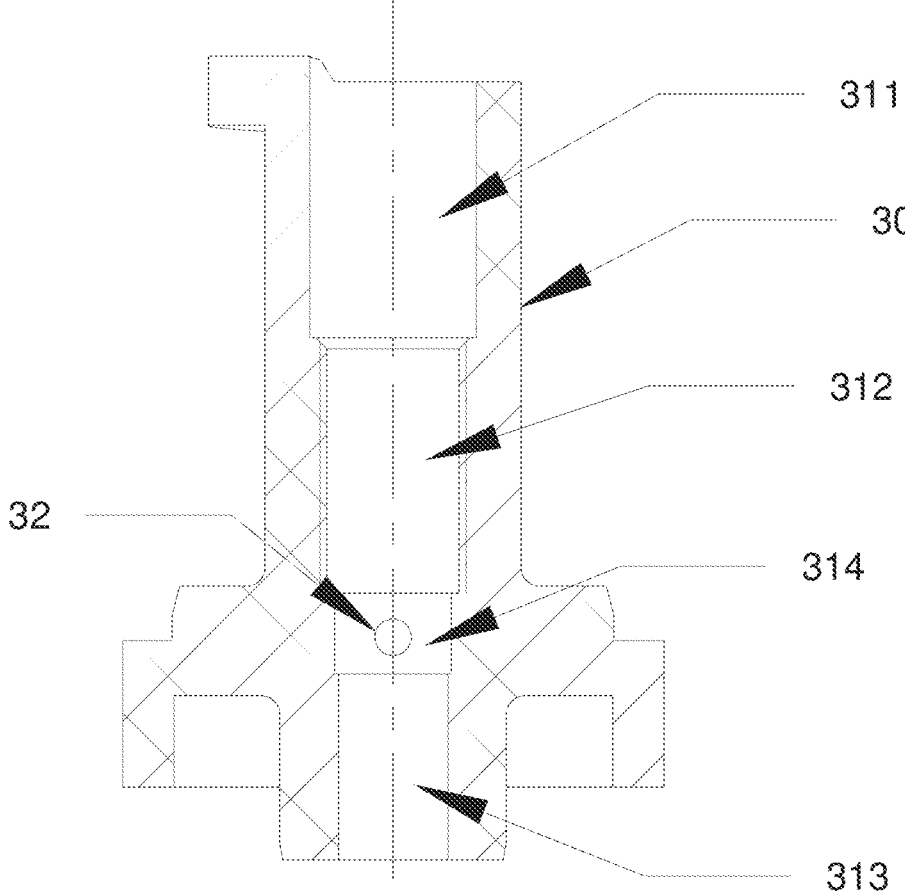
FIG. 3 shows a sectional view of a nut seat according to an embodiment of the present disclosure.
Figure 4:
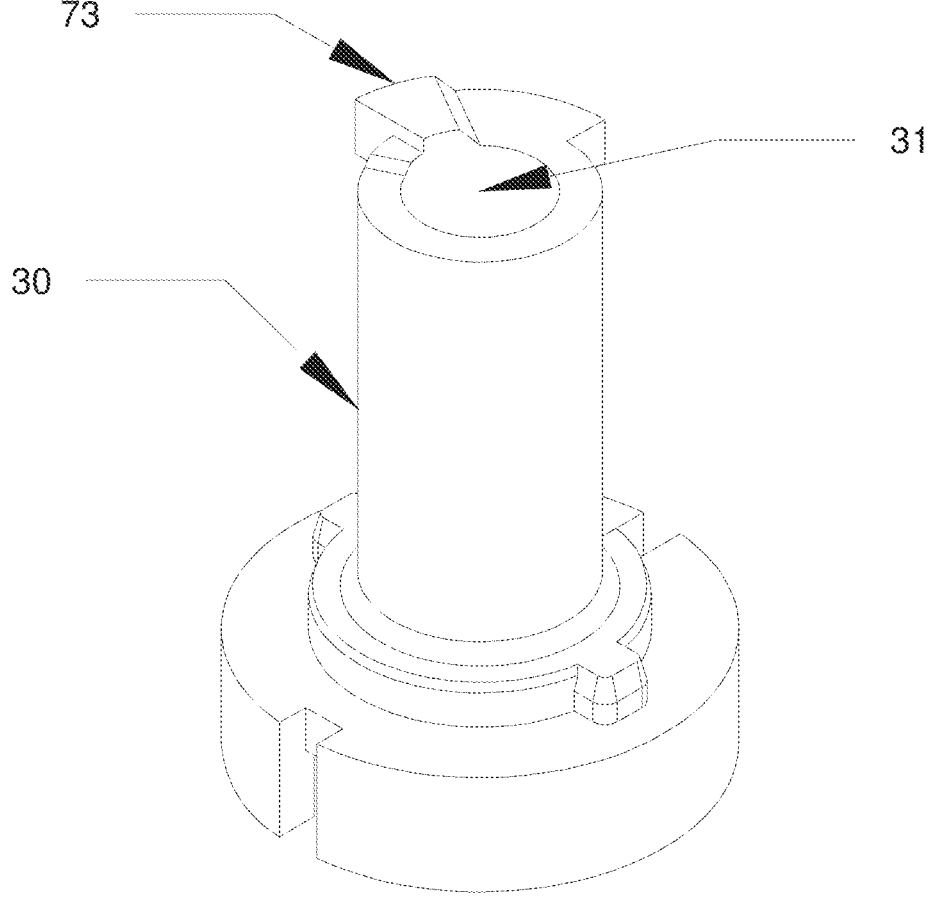
FIG. 4 shows a schematic structural diagram of a nut seat according to an embodiment of the present disclosure.

The above figures include the following reference numerals:

10, valve housing; 11, accommodating cavity; 12, valve port; 20, valve needle; 21, first end of valve needle; 22, second end of valve needle; 23, first guide section; 24, threaded section; 25, second guide section; 26, third guide section; 30, nut seat; 31, first through hole; 311, first guide hole section; 312, threaded hole section; 313, second guide hole section; 314, first hole section; 32, air hole; 40, magnetic rotor; 50, connecting plate; 60, stopper; 61, third through hole; 611, second hole section; 612, third hole section; 71, first stop boss; 72, second stop boss; and 73, stop portion.

DETAILED DESCRIPTION OF THE EMBODIMENTS

The technical solutions of the examples of the present disclosure will be clearly and completely described below in combination with the accompanying drawings of the examples of the present disclosure. Apparently, the examples described are merely some examples rather than all examples of the present disclosure. The following description of at least one exemplary example is merely illustrative in nature and in no way serves as any limitation of the present disclosure and its application or uses. On the basis of the examples of the present disclosure, all other examples obtained by those of ordinary skill in the art without making creative efforts fall within the scope of protection of the present disclosure.

As shown in FIGS. 1-4, an example of the present disclosure provides an electronic expansion valve. The electronic expansion valve includes a valve housing 10, a valve needle 20 and a nut seat 30. The valve housing 10 is provided with an accommodating cavity 11 and a valve port 12, and the accommodating cavity 11 is in communication with the valve port 12. The valve needle 20 is provided with a first end and a second end that are arranged opposite each other, and the second end 22 of the valve needle blocks or opens the valve port 12. Thus, a flow speed of fluid flowing through the valve port 12 can be controlled. The valve needle 20 includes a first guide section 23, a threaded section 24 and a second guide section 25 that are sequentially arranged, where the first guide section 23 is arranged close to the first end 21 of the valve needle, and the second guide section 25 is arranged close to the second end 22 of the valve needle; and the nut seat 30 is arranged in the accommodating cavity 11 and is fixedly connected with the valve housing 10, a first through hole 31 is provided on the nut seat 30, the first through hole 31 includes a first guide hole section 311, a threaded hole section 312 and a second guide hole section 313 that are sequentially arranged, wherein the valve needle 20 is arranged in the first through hole 31 in a penetrating manner, the first guide hole section 311 is cooperated with the first guide section 23 for guiding, the threaded hole section 312 is in threaded connection with the threaded section 24, and the second guide hole section 313 is cooperated with the second guide section 25 for guiding. The threaded hole section 312 is in threaded connection with the threaded section 24, such that the valve needle 20 rotates around the nut seat 30, and the valve needle 20 moves relative to the nut seat 30 in an axial direction. The first guide hole section 311 matches the first guide section 23 for guiding, and the second guide hole section 313 matches the second guide section 25 for guiding, such that the valve needle 20 is maintained coaxial with the valve port 12 during movement.

By applying the technical solution of the present disclosure, the first guide hole section 311 is cooperated with the first guide section 23 for guiding, and the first guide section 23 is arranged close to the first end 21 of the valve needle. Thus, the valve needle 20, especially a part of the valve needle close to the first end 21 of the valve needle, can be guided. Then, the second guide hole section 313 is cooperated with the second guide section 25 for guiding, and the second guide section 25 is arranged close to the second end 22 of the valve needle. Thus, a portion of the valve needle 20 close to the second end 22 of the valve needle can be guided. The valve needle 20 and the valve port 12 can maintain high coaxiality by means of matching of guide structures at two ends of the valve needle, thereby improving overall control precision of the electronic expansion valve.

In some embodiments, the first guide hole section 311 is in clearance fit with the first guide section 23, and the second guide hole section 313 is in clearance fit with the second guide section 25. Thus, a guiding effect on the valve needle 20 can be ensured while a stable movement of the valve needle 20 is ensured, thereby further improving coaxiality between the valve needle 20 and the valve port 12. In some embodiments, a clearance between the first guide hole section 311 and the first guide section 23 ranges from 0.05 mm to 0.1 mm, so as to ensure that the first guide hole section 311 matches the first guide section 23 to have an excellent guiding effect on the valve needle 20, and ensure that a movement resistance between the first guide section 23 and the first guide hole section 311 is small when the valve needle 20 moves. In some embodiments, a clearance between the second guide hole section 313 and the second guide section 25 ranges from 0.01 mm to 0.09 mm. Such a configuration has an excellent guiding effect on the valve needle 20 and ensures that a movement resistance between the second guide hole section 313 and the second guide section 25 is small when the valve needle 20 moves.

In some embodiments, a diameter of the first guide section 23 is greater than a diameter of the threaded section 24, and the diameter of the threaded section 24 is greater than a diameter of the second guide section 25. Furthermore, the diameter of the second guide section 25 is greater than a diameter of an end portion of the second end 22 of the valve needle. With such a configuration, the valve needle 20 can be conveniently mounted into the first through hole 31 from a portion above the first through hole 31, such that the nut seat 30 can be fixed on the valve housing 10 and then the valve needle 20 can be mounted, and the electronic expansion valve is convenient to assemble, thereby improving mounting efficiency. In other examples, a first guide section 23 has a diameter less than a diameter of a threaded section 24, the threaded section 24 has the diameter less than a diameter of the second guide section 25, and a valve needle 20 is mounted into a first through hole 31 from a portion below the first through hole 31.

In some embodiments, an air hole 32 is provided on the nut seat 30, and the air hole 32 is in communication with the first through hole 31. By providing the air hole 32, air pressure in the first through hole 31 and the accommodating cavity 11 can be balanced such that a resistance caused by a pressure difference to the valve needle 20 can be eliminated or reduced, and the valve needle 20 can move smoothly in the nut seat 30.

In some embodiments, a first hole section 314 is arranged between the threaded hole section 312 and the second guide hole section 313, an inner diameter of the first hole section 314 is greater than an inner diameter of the second guide hole section 313 and less than an inner diameter of the threaded hole section 312, and the air hole 32 is provided on a side wall of the first hole section 314. With the above structure, the second guide section 25 of the valve needle 20 is arranged in the first hole section 314, and a large clearance is provided between the first hole section 314 and the second guide section 25, such that the air hole 32 has an excellent ventilation effect, and the air pressure in the first through hole 31 and the accommodating cavity 11 can be balanced better. In other examples, the air hole 32 may further be provided on a side wall of a second guide hole section 313 or a threaded hole section 312.

In some embodiments, the valve needle 20 further includes a third guide section 26, wherein the third guide section 26 is arranged on a side of the first guide section 23 away from the threaded section 24; and the electronic expansion valve further includes a magnetic rotor 40, where the magnetic rotor 40 is arranged in the accommodating cavity 11, and the magnetic rotor 40 is fixedly connected with the third guide section 26. When the magnetic rotor 40 rotates, the third guide section 26 and the valve needle 20 are driven to rotate, such that the valve needle 20 rotates relative to the nut seat 30 and moves in an axial direction.

In some embodiments, a diameter of the third guide section 26 is less than a diameter of the first guide section 23. Thus, other structures can be avoided to prevent interference between the third guide section 26 and other structures of the electronic expansion valve. Furthermore, with such a configuration, the electronic expansion valve can further be compact in structure and small in size.

In some embodiments, the electronic expansion valve further includes a connecting plate 50, wherein the connecting plate 50 is arranged in the magnetic rotor 40, a peripheral edge of the connecting plate 50 is fixedly connected with the magnetic rotor 40, a second through hole is provided on the connecting plate 50, the second through hole is provided coaxial with the first through hole 31, and the third guide section 26 is arranged in the second through hole in a penetrating manner and is fixedly connected with an inner wall of the second through hole. The connecting plate 50 is arranged, thereby enhancing connection stability between the third guide section 26 and the magnetic rotor 40. The connecting plate 50 and the magnetic rotor 40 can be integrally arranged, and the connecting plate 50 can be fixedly connected to the third guide section 26 by means of welding.

Figure 5:
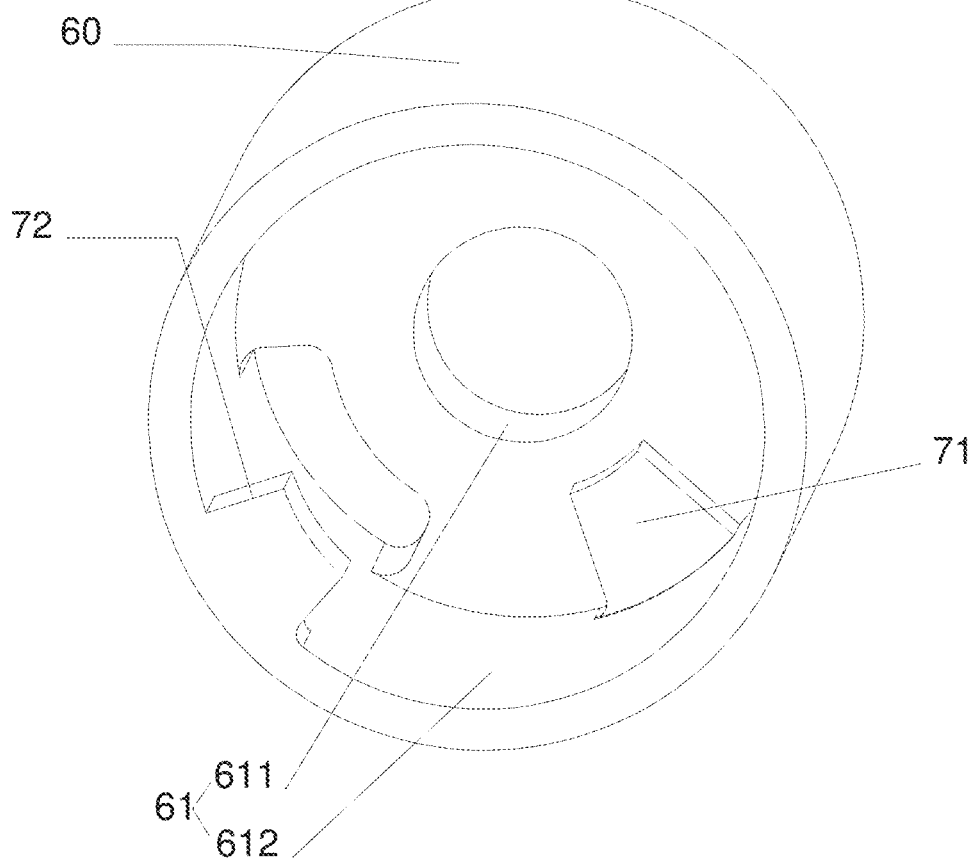
FIG. 5 shows a schematic structural diagram of a stopper according to an embodiment of the present disclosure.

As shown in FIG. 5, in some embodiments, the electronic expansion valve further includes a stopper 60, wherein a stop structure is arranged between the stopper 60 and the nut seat 30, an upper surface of the stopper 60 is fixedly connected with a bottom surface of the connecting plate 50, a third through hole 61 is provided on the stopper 60, and the third through hole 61 includes a second hole section 611 and a third hole section 612 that are in communication with each other, where an inner diameter of the second hole section 611 is less than an inner diameter of the third hole section 612, the third guide section 26 is arranged in the third through hole 61 in a penetrating manner, and the third guide section 26 is in transition fit with the second hole section 611. The third through hole 61 of the stopper 60 is provided coaxial with the second through hole. The third guide section 26 is in transition fit with the second hole section 611. Thus, the second hole section 611 can guide the third guide section 26, thereby further improving coaxiality between the valve needle 20 and the valve port 12.

In some embodiments, the stop structure includes a first stop boss 71, a second stop boss 72 and a stop portion 73. The first stop boss 71 and the second stop boss 72 are arranged on an inner wall of the third hole section 612 at an interval in an axial direction of the first through hole 31. The stop portion 73 is arranged on an outer side wall of the nut seat 30, the stop portion 73 is located between the first stop boss 71 and the second stop boss 72, the valve needle 20 has a maximum opening position opening the valve port 12 and a closing position blocking the valve port 12, and the first stop boss 71 abuts against the stop portion 73 when the valve needle 20 moves to the closing position, and the second stop boss 72 abuts against the stop portion 73 when the valve needle 20 moves to the maximum opening position. In the embodiments, the first stop boss 71 is located above the second stop boss 72, and the stop portion 73 is arranged on the outer side wall of the nut seat 30. When the stop portion 73 abuts against the first stop boss 71, the valve needle 20 moves to a lowest position, and the valve needle 20 blocks the valve port 12 to prevent fluid from passing. When the stop portion 73 abuts against the second stop boss 72, the valve needle 20 moves to a highest position, and an opening degree between the valve needle 20 and the valve port 12 is maximum. With such a configuration, a vertical movement range of the valve needle 20 is determined, such that an excessively large size of the valve body caused by excessively high upward displacement of the valve needle 20 is avoided, and damage of the valve needle 20 or the valve port 12 caused by impact generated to the valve port 12 when the valve needle 20 falls is avoided, thereby prolonging a service life of the electronic expansion valve.

It should be noted that the terms used herein are merely for describing the particular embodiments and are not intended to limit the exemplary embodiments according to the present disclosure. As used herein, the singular is also intended to include the plural unless the context clearly dictates, and furthermore, it should be understood that the terms "include" and/or "comprise", when used in the description, specify the presence of features, steps, operations, devices, components, and/or combinations thereof.

The relative arrangement, numerical expressions and values of components and steps described in these examples do not limit the scope of the present disclosure unless otherwise specified. Moreover, it should be understood that the sizes of various portions shown in the accompanying drawings are not drawn to the actual scale for ease of description. Techniques, methods and apparatuses known to those of ordinary skill in the related field may not be discussed in detail but, where appropriate, should be considered a part of the authorized description. In all examples shown and discussed herein, any specific value should be interpreted as merely exemplary and not as a limitation. Therefore, other examples of the exemplary examples may have different values. It should be noted that similar reference numerals and letters in the following accompanying drawings represent similar items, and therefore, once an item is defined in one accompanying drawing, the item does not need to be further discussed in subsequent accompanying drawings.

In the description of the present disclosure, it needs to be understood that the orientation or positional relations indicated by the directional words "front, rear, upper, lower, left, and right", "transverse, upright, vertical, and horizontal", "top and bottom", etc. are usually based on the orientation or positional relations shown in the accompanying drawings, are merely for facilitating the description of the present disclosure and simplifying the description, rather than indicating or implying that a device or element indicated must have a particular orientation or be constructed and operated in a particular orientation, unless otherwise stated to the contrary, and therefore will not be constructed as limiting the scope of protection of the present disclosure; and the directional word "inside and outside" refers to the inside and outside relative to the contour of each component itself.

For ease of description, spatial relative terms such as "over", "above", "on an upper surface" and "on" may be used herein to describe spatial positional relations of one device or feature with other devices or features as shown in the accompanying drawings. It should be understood that the spatial relative terms are intended to include different orientations in use or operation in addition to the orientation of the device described in the accompanying drawings. For example, if the device in the accompanying drawings is inverted, the device described as "above" or "over" other devices or structures would then be positioned "below" or "under" the other devices or structures. Thus, the exemplary term "above" may include two orientations of "above" and "below". The device may also be positioned (rotated 90 degrees or at other orientations) in other different ways and the spatial relative description used herein is interpreted accordingly.

Furthermore, it should be noted that use of words such as "first" and "second" to define components is merely for distinguishing corresponding components. Unless otherwise stated, the above words have no special meaning and thus cannot be understood as limiting the scope of protection of the present disclosure.

What are described above are merely the preferred examples of the present disclosure and are not used for limiting the present disclosure, and various modifications and changes can be made to the present disclosure by those skilled in the art. Any modification, equivalent substitution, improvement, etc. made within the spirit and principle of the present disclosure shall fall within the scope of protection of the present disclosure.

What is claimed is:

1. An electronic expansion valve, comprising:

a valve housing, wherein the valve housing is provided with an accommodating cavity and a valve port, and the accommodating cavity is in communication with the valve port;

a valve needle, wherein the valve needle is provided with a first end and a second end that are arranged opposite each other, the second end of the valve needle blocks or opens the valve port, and the valve needle comprises a first guide section, a threaded section and a second guide section that are sequentially arranged, wherein the first guide section is arranged close to the first end of the valve needle, and the second guide section is arranged close to the second end of the valve needle; and a nut seat, wherein the nut seat is arranged in the accommodating cavity and is fixedly connected with the valve housing, a first through hole is provided on the nut seat, and the first through hole comprises a first guide hole section, a threaded hole section and a second guide hole section that are sequentially arranged, wherein the valve needle is arranged in the first through hole in a penetrating manner, the first guide hole section is cooperated with the first guide section for guiding, the threaded hole section is in threaded connection with the threaded section, and the second guide hole section is cooperated with the second guide section for guiding;

the valve needle further comprises a third guide section, wherein the third guide section is arranged on a side of the first guide section away from the threaded section; and the electronic expansion valve further comprises a magnetic rotor, wherein the magnetic rotor is arranged in the accommodating cavity, and the magnetic rotor is fixedly connected with the third guide section;

wherein the valve needle is an integral structure formed by the first guide section, the threaded section, the second guide section and the third guide section.

2. The electronic expansion valve as claimed in claim 1, wherein the first guide hole section is in clearance fit with the first guide section, and the second guide hole section is in clearance fit with the second guide section.

3. The electronic expansion valve as claimed in claim 1, wherein the first guide section has a diameter greater than a diameter of the threaded section, and the diameter of the threaded section is greater than a diameter of the second guide section.

4. The electronic expansion valve as claimed in claim 1, wherein an air hole is provided on the nut seat, and the air hole is in communication with the first through hole.

5. The electronic expansion valve as claimed in claim 4, wherein a first hole section is arranged between the threaded hole section and the second guide hole section, an inner diameter of the first hole section is greater than an inner diameter of the second guide hole section and less than an inner diameter of the threaded hole section, and the air hole is provided on a side wall of the first hole section.

6. The electronic expansion valve as claimed in claim 1, wherein a diameter of the third guide section is less than a diameter of the first guide section.

7. The electronic expansion valve as claimed in claim 1, further comprising a connecting plate, wherein the connecting plate is arranged in the magnetic rotor, a peripheral edge of the connecting plate is fixedly connected with the magnetic rotor, a second through hole is provided on the connecting plate, the second through hole is provided coaxial with the first through hole, and the third guide section is arranged in the second through hole in a penetrating manner and is fixedly connected with an inner wall of the second through hole.

8. The electronic expansion valve as claimed in claim 7, further comprising a stopper, wherein a stop structure is arranged between the stopper and the nut seat, an upper surface of the stopper is fixedly connected with a bottom surface of the connecting plate, a third through hole is provided on the stopper, and the third through hole comprises a second hole section and a third hole section that are in communication with each other, wherein an inner diameter of the second hole section is less than an inner diameter of the third hole section, the third guide section is arranged in the third through hole in a penetrating manner, and the third guide section is in transition fit with the second hole section.

9. The electronic expansion valve as claimed in claim 8, wherein the stop structure comprises:

a first stop boss and a second stop boss that are arranged on an inner wall of the third hole section at an interval in an axial direction of the first through hole; and a stop portion arranged on an outer side wall of the nut seat, wherein the stop portion is located between the first stop boss and the second stop boss, the valve needle has a maximum opening position opening the valve port and a closing position blocking the valve port, and the first stop boss abuts against the stop portion when the valve needle moves to the closing position, and the second stop boss abuts against the stop portion when the valve needle moves to the maximum opening position.

* * * * *